United States Patent
Thandu

(10) Patent No.: US 7,580,720 B2
(45) Date of Patent: *Aug. 25, 2009

(54) METHOD AND SYSTEM FOR PROTOCOL FEATURE COMMUNICATION

(75) Inventor: Balasubramaniam Kulasekaran Thandu, Cedar Park, TX (US)

(73) Assignee: AT&T Intellectual Property I, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 11/724,432

(22) Filed: Mar. 15, 2007

(65) Prior Publication Data

US 2007/0161391 A1  Jul. 12, 2007

Related U.S. Application Data

(63) Continuation of application No. 10/452,823, filed on Jun. 2, 2003, now Pat. No. 7,209,761.

(51) Int. Cl.
*H04B 7/00* (2006.01)
*H04Q 7/20* (2006.01)

(52) U.S. Cl. .............. 455/517; 455/403; 455/418; 455/419; 455/519; 370/466; 370/467; 370/463; 370/338; 375/222

(58) Field of Classification Search ........... 455/517, 455/418, 419, 403, 410, 519; 370/466, 467; 375/222

See application file for complete search history.

(56) References Cited

U.S. PATENT DOCUMENTS

| | | | |
|---|---|---|---|
| 5,297,192 A | 3/1994 | Gerszberg | |
| 5,301,223 A | 4/1994 | Amadon et al. | |
| 5,483,531 A | 1/1996 | Jouin et al. | |
| 5,488,693 A | 1/1996 | Houck et al. | |
| 5,603,081 A | 2/1997 | Raith et al. | |
| 5,778,316 A | 7/1998 | Persson et al. | |
| 5,794,142 A | 8/1998 | Vanttila et al. | |
| 5,857,153 A | 1/1999 | Lupien | |
| 5,864,762 A | 1/1999 | Childress | |
| 5,924,026 A * | 7/1999 | Krishnan | 455/414.1 |
| 5,950,130 A * | 9/1999 | Coursey | 455/432.1 |
| 5,966,663 A | 10/1999 | Gleason | |
| 6,006,091 A | 12/1999 | Lupien | |
| 6,070,080 A * | 5/2000 | Madour et al. | 455/458 |
| 6,134,438 A | 10/2000 | Sawyer | |
| 6,212,203 B1 * | 4/2001 | Anderson et al. | 370/473 |
| 6,223,028 B1 * | 4/2001 | Chang et al. | 455/419 |
| 6,321,095 B1 | 11/2001 | Gavette | |
| 6,377,807 B1 * | 4/2002 | Iparrea et al. | 455/445 |
| 6,490,445 B1 | 12/2002 | Holmes | |
| 6,542,730 B1 * | 4/2003 | Hosain | 455/410 |
| 6,584,089 B1 | 6/2003 | Honkasalo et al. | |
| 6,597,921 B2 * | 7/2003 | Thandu | 455/517 |
| 6,650,893 B1 | 11/2003 | Lipsit | |
| 6,704,563 B1 | 3/2004 | Senn et al. | |
| 6,795,704 B1 * | 9/2004 | Hardin | 455/432.3 |

(Continued)

*Primary Examiner*—Marceau Milord
(74) *Attorney, Agent, or Firm*—Brinks Hofer Gilson & Lione

(57) ABSTRACT

Systems and methods for communicating support or absence of support of a plurality of protocol features are disclosed. Generally, a plurality of bits is received, each individual bit indicating support or absence of support of a different protocol features. The received plurality of bits are analyzed to determine which protocol features are supported by a first telecommunications station.

6 Claims, 2 Drawing Sheets

U.S. PATENT DOCUMENTS 6,836,651 B2   12/2004   Segal et al.
6,876,631 B2 *  4/2005   Suzuki et al. ............... 370/252
6,879,825 B1    4/2005   Daly
7,209,761 B2 *  4/2007   Thandu ...................... 455/517

* cited by examiner

METHOD AND SYSTEM FOR PROTOCOL FEATURE COMMUNICATION

RELATED APPLICATIONS

The present patent document is a continuation of U.S. patent application Ser. No. 10/452,823, filed Jun. 2, 2003, now U.S. Pat. No. 7,209,761 the entirety of which is hereby incorporated by reference.

TECHNICAL FIELD

The present invention relates to telecommunication networks and, more particularly, to a method and system for communicating protocol features supported by a mobile station and a base station message center inter-working.

BACKGROUND

Under the most current revision of a TIA/EIA-1 36 telecommunication standard, there are five protocols for identifying features that may be supported, mandatorily or optionally, by a mobile station and a base station message center inter-working (hereinafter "BMI"). A first protocol version TIA/EIA-1 36-A PV1 (hereinafter "PV1") including three mandatory features and twenty-five optional features is illustrated in the following TABLE 1:

TABLE 1

| PV1 FEATURES | OPTIONAL/MANDATORY |
| --- | --- |
| Intelligent Roaming | Optional |
| Multilingual Display | Optional |
| ISO-8859 (Latin 1) | Mandatory |
| ISO-10646 (BMP) | Optional |
| ISO-8859-8 (Latin/Hebrew) | Optional |
| Async Data | Optional |
| G3-Fax | Optional |
| DADS | Optional |
| Non-Public Mode | Optional |
| DTX | Optional |
| Subaddressing | Optional |
| User Group | Optional |
| Half-Rate DTC | Optional |
| Double-Rate DTC | Optional |
| Triple-Rate DTC | Optional |
| STU-III | Optional |
| Total Charge Info | Optional |
| TSAR | Mandatory |
| Cellular Messaging Teleservice | Optional |
| GUTS | Optional |
| OATS | Optional |
| OPTS | Optional |
| SMS Submit | Optional |
| R-Data Delivery on DTC | Mandatory |
| PFC 2 to 8 | Optional |
| ACELP | Optional |
| OMEA and VPM | Optional |

A second protocol version TIA/EIA-136-A PV2 (hereinafter "PV2") includes one mandatory feature and two optional features in addition to the three mandatory features and twenty-five optional features of PV1. The specific mandatory feature and optional features of PV2 are illustrated in the following TABLE 2:

TABLE 2

| PV2 FEATURES | OPTIONAL/MANDATORY |
| --- | --- |
| Downlink Power Control | Mandatory |
| Enhanced MACA | Optional |
| BATS | Optional |

A third protocol version TIA/EIA-136-A PV3 (hereinafter "PV3") includes zero mandatory features and five optional features in addition to the four mandatory features and twenty-seven optional features of PV1 and PV2. The specific optional features of PV3 are illustrated in the following TABLE 3:

TABLE 3

| PV3 FEATURES | OPTIONAL/MANDATORY |
| --- | --- |
| 136+ Packet Data | Optional |
| 8-PSK Modulation | Optional |
| Extended Voice Mode | Optional |
| US1 Vocoder | Optional |
| Interleaving | Optional |

A fourth protocol version TIA/EIA-136-B PV4 (hereinafter "PV4") includes two mandatory features and three optional features in addition to the four mandatory features and thirty-two optional features of PV1, PV2 and PV3. The specific mandatory features and optional features of PV4 are illustrated in the following TABLE 4:

TABLE 4

| PV4 FEATURES | OPTIONAL/MANDATORY |
| --- | --- |
| Enhanced Privacy and Encryption | Mandatory |
| Added Diversity For Improvement in Channel Errors | Optional |
| GPRS-136 | Optional |
| +Code Dialing | Mandatory |
| Charge Indication Teleservice | Optional |

A fifth protocol version TIA/EIA-136-C PV5 (hereinafter "PV5") includes zero mandatory features and nine optional features in addition to the six mandatory features and thirty-five optional features of PV1, PV2, PV3 and PV4. The specific optional features of PV5 are illustrated in the following TABLE 5:

TABLE 5

| PV5 FEATURES | OPTIONAL/MANDATORY |
| --- | --- |
| Removable User Identity Module (R-UIM) | Optional |
| EGPRS-136 | Optional |
| Adaptive Multi-Rate (AMR) | Optional |
| Fast Power Control | Optional |
| Teleservice Over GSM SMS | Optional |
| Transmit Diversity on DTC | Optional |
| High Penetration Paging (HPP) | Optional |
| System Assisted Mobile Positioning Through Satellite | Optional |

Currently, there are two mechanisms employed by telecommunication networks for communicating which mandatory features of PV1-PV5 are supported by a mobile station and a BMI. The first mechanism involves the mobile station and the BMI agreeing, during an initial registration process, on the lowest common denominator of features between PV1-PV5 that is being supported by the mobile station and the BMI. Thus, the mobile station and the BMI are able to identify the mandatory features being supported by the mobile station and the BMI. The second mechanism involves including a list of supported mandatory features within a Capability Request message and a Capability Report message.

Although the two mechanisms have utility, a limitation of the two mechanisms is the failure to communicate optional features of PV1-PV5 that are supported by the mobile station and the BMI. As such, in order to determine if a particular optional feature is supported, for example the teleservice feature of PV5, the BMI currently sends an R-DATA message corresponding to an optional feature to the mobile station and a reception of a R-DATA REJECT message from the mobile station indicates to the BMI that the mobile station is not supporting the optional feature. However, this method can be a signaling drain.

Another limitation under the current TIA/EIA-136 is a restriction of having to implement all mandatory features from a selected protocol version and each preceding protocol version. For example, a manufacturer of a mobile station having PV5 must also implement the mandatory features of PV1-PV4. However, mandatory features of PV1-PV4 may not be commercially demanded by consumers or required by the carrier of the mobile station. Thus, the restriction has an impact on the development costs and schedules of mobile stations, which in turn affects the deployment of related mobile services.

Accordingly, there is a need for an improved method and system for communicating supported mandatory and optional features under the TIA/EIA-136 standard and similar types of standards.

DETAILED DESCRIPTION OF THE DRAWINGS

Figure 1:
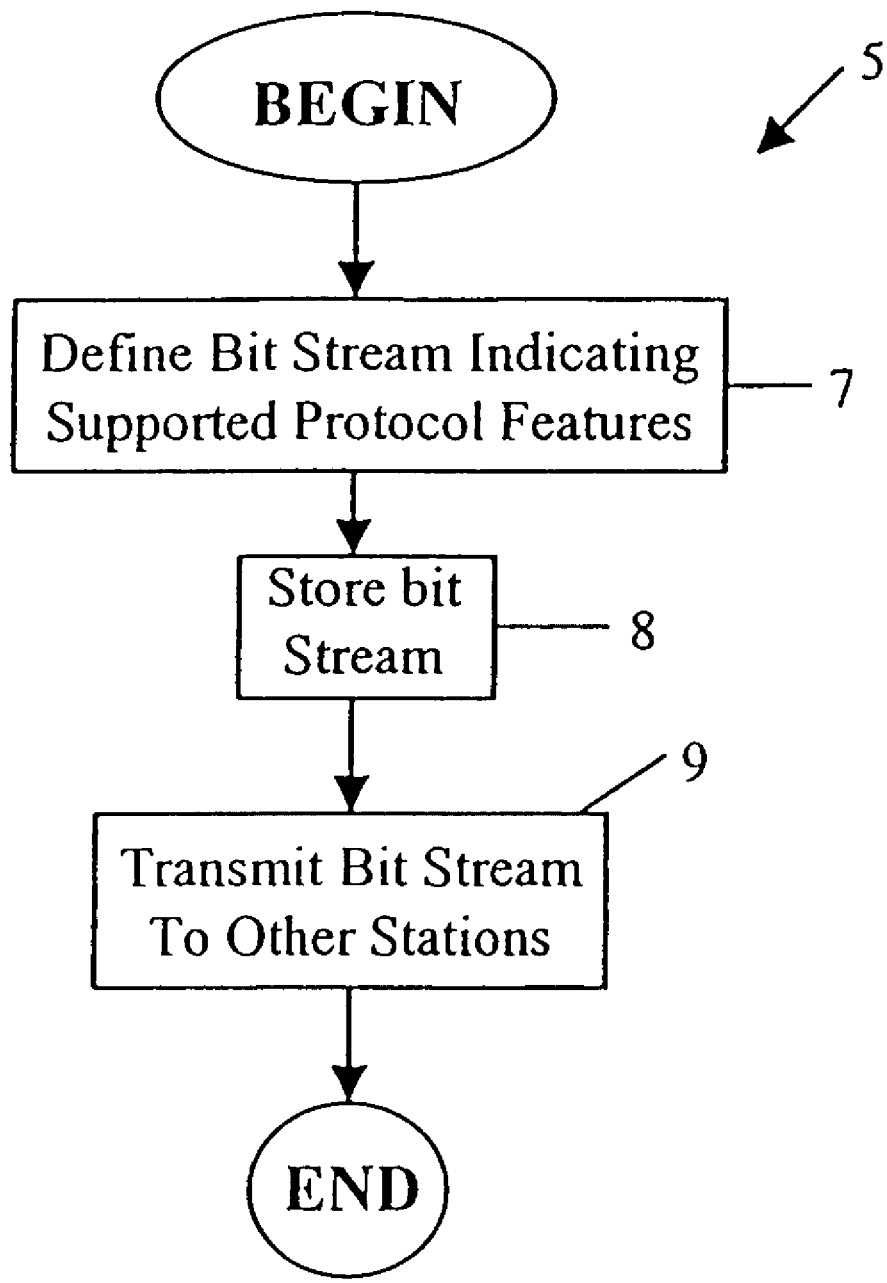
FIG. 1 is a flow chart of a method of communicating supported protocol features in accordance with an embodiment of the invention.

It is an advantage of the present invention to provide an improved method and system for establishing which protocol features are mutually supported by communicating telecommunication stations.

One form of the present invention is a method for communicating a set of one or more protocol features supported by a telecommunication station. First, a bit stream is defined. Each bit of the bit stream represents a separate distinct feature supported by a protocol. Second, each bit of the bit stream is set in either a first logic state or a second logic state. The first logic state indicates a support of a corresponding distinct feature by the telecommunication station, and the second logic state indicates an absence of support of the corresponding distinct feature by the telecommunication station. Finally, the bit stream is stored within the telecommunication station.

A second form of the present invention is a computer program product in a computer-useable medium for communicating a set of one or more protocol features supported by a first telecommunication station to a second telecommunication station. The computer program product comprises program code for storing a bit stream, where each bit of the bit stream represents a separate distinct feature supported by a protocol. Each bit of the bit stream is set in either a first logic state or a second logic state. The first logic state indicates support of a corresponding distinct feature by the telecommunication station, and the second logic state indicates an absence of support of the corresponding distinct feature by the telecommunication station. The computer program product further comprises program code for transmitting the bit stream to the second telecommunication station.

A third form of the present invention is a method communicating a set of one or more protocol features supported by a first telecommunication station to a second telecommunication station. First, the first telecommunication station transmits a bit stream to the second telecommunication station, where each bit of the bit stream represents a separate distinct feature provided by a protocol. Each bit of the bit stream is set in either a first logic state or a second logic state. The first logic state indicates a support of a corresponding distinct feature by the first telecommunication station, and the second logic state indicates an absence of support of the corresponding distinct feature by the first telecommunication station. The second telecommunication station identifies each bit of the first bit stream that is set in the first logic state to determine each protocol feature of the first protocol supported by the first telecommunication station.

A fourth form of the present invention is a telecommunication network, comprising at least a pair of telecommunication stations. A first telecommunication station is operable to transmit a bit stream, where each bit of the bit stream represents a separate distinct feature provided by a protocol. Each bit of the bit stream is set in either a first logic state or a second logic state. The first logic state indicates a support of a corresponding distinct feature by the telecommunication station, and the second logic state indicates an absence of support of the corresponding distinct feature by the telecommunication station. The second telecommunication station is operable to identify each bit of the bit stream being set in the first logic state to determine each protocol feature supported by the first telecommunication station.

The foregoing forms and other forms, features and advantages of the invention will become further apparent from the following description of the presently preferred embodiments, read in conjunction with the accompanying drawings. The following description and drawings are merely illustrative of the invention rather than limiting, the scope of the invention being defined by the appended claims and equivalents thereof.

Turning now to the drawings, and in particular to FIG. 1, there is shown a flow chart 5 of an exemplary method of communicating supported protocol features.

A protocol communication method of the present invention includes defining a bit stream for each PV1-PV5 with each bit of a bit stream representing a separate distinct protocol feature (step 7). Additionally, each bit is set to either a logic "0" state for indicating an absence of support of the corresponding feature by a telecommunication station, e.g. a mobile station or a BMI, or a logic "1" state for indicating a support of the corresponding feature by a telecommunication station. The bit stream can be based on bit maps corresponding to the protocol versions, as will be described in further detail below.

Next, in step 8, bit stream is stored locally in the telecommunication station. The stored bit stream can be transferred to other stations to communicate which protocol features are supported by the telecommunication station (step 9).

An exemplary bit map for PV1 is shown in the following TABLE 6:

TABLE 6

| PVI FEATURES | SUPPORT BIT POSITION OF $BS_3$ |
|---|---|
| Intelligent Roaming | xxxx xxxx xxxx xxxx xxxx xxxx xxxx xxx1 |
| Multilingual Display | xxxx xxxx xxxx xxxx xxxx xxxx xxxx xx1x |
| ISO-8859 (Latin 1) | xxxx xxxx xxxx xxxx xxxx xxxx xxxx x1xx |
| ISO-10646 (BMP) | xxxx xxxx xxxx xxxx xxxx xxxx xxxx 1xxx |
| ISO-8859-8 (Latin/Hebrew) | xxxx xxxx xxxx xxxx xxxx xxxx xxx1 xxxx |
| Async Data | xxxx xxxx xxxx xxxx xxxx xxxx xx1x xxxx |
| G3-Fax | xxxx xxxx xxxx xxxx xxxx xxxx x1xx xxxx |
| DADS | xxxx xxxx xxxx xxxx xxxx xxxx 1xxx xxxx |
| Non-Public Mode | xxxx xxxx xxxx xxxx xxxx xxx1 xxxx xxxx |
| DTX | xxxx xxxx xxxx xxxx xxxx xx1x xxxx xxxx |
| Subaddressing | xxxx xxxx xxxx xxxx xxxx x1xx xxxx xxxx |
| User Group | xxxx xxxx xxxx xxxx xxxx 1xxx xxxx xxxx |
| Half-Rate DTC | xxxx xxxx xxxx xxxx xxx1 xxxx xxxx xxxx |
| Double-Rate DTC | xxxx xxxx xxxx xxxx xx1x xxxx xxxx xxxx |
| Triple-Rate DTC | xxxx xxxx xxxx xxxx x1xx xxxx xxxx xxxx |
| STU-III | xxxx xxxx xxxx xxxx 1xxx xxxx xxxx xxxx |
| Total Charge Info | xxxx xxxx xxxx xxx1 xxxx xxxx xxxx xxxx |
| TSAR | xxxx xxxx xxxx xx1x xxxx xxxx xxxx xxxx |
| Cellular Messaging | xxxx xxxx xxxx x1xx xxxx xxxx xxxx xxxx |
| Teleservice | xxxx xxxx xxxx 1xxx xxxx xxxx xxxx xxxx |
| GUTS | xxxx xxxx xxx1 xxxx xxxx xxxx xxxx xxxx |
| OATS | xxxx xxxx xx1x xxxx xxxx xxxx xxxx xxxx |
| OPTS | xxxx xxxx x1xx xxxx xxxx xxxx xxxx xxxx |
| SMS Submit | xxxx xxxx 1xxx xxxx xxxx xxxx xxxx xxxx |
| R-Data Delivery on DTC | xxxx xxx1 xxxx xxxx xxxx xxxx xxxx xxxx |
| PFC 2 to 8 | xxxx xx1x xxxx xxxx xxxx xxxx xxxx xxxx |
| ACELP OMEA and VPM | xxxx x1xx xxxx xxxx xxxx xxxx xxxx xxxx |

Referring to TABLE 6, a bit stream (hereinafter "$BS_3$") having thirty-two bits is defined for PV1. The least significant twenty-seven bit positions of $BS_3$ are representative of twenty-seven protocol features of PV1 with the most significant five bit positions being reserved. TABLE 6 illustrates a bit position indicating a support by a telecommunication station of a corresponding separate and distinct protocol feature of PV1. The $BS_3$ being xxxx x000 0000 0000 0000 0000 0000 0000 indicates that none of the features of PV1 are being supported by a telecommunication station.

An exemplary bit map for PV2 is shown in the following TABLE 7:

TABLE 7

| PV2 FEATURES | SUPPORT BIT POSITION OF $BS_4$ |
|---|---|
| Downlink Power Control | xxxx xxx1 |
| Enhanced MACA | xxxx xx1x |
| BATS | xxxx x1xx |

Referring to TABLE 7, a bit stream (hereinafter "$BS_4$") having eight bits is defined for PV2. The least significant three bit positions of $BS_4$ are representative of three protocol features of PV2 with the most significant five bit positions being reserved. TABLE 7 illustrates a bit position indicating a support by a telecommunication station of a corresponding separate and distinct protocol feature of PV2. The $BS_4$ being xxxx x000 indicates that none of the features of PV2 are being supported by a telecommunication station.

An exemplary bit map for PV3 is shown in the following TABLE 8:

TABLE 8

| PV3 FEATURES | SUPPORT BIT POSITION OF $BS^5$ |
|---|---|
| 136+ Packet Data | xxxx xxx1 |
| 8-PSK Modulation | xxxx xx1x |
| Extended Voice Mode | xxxx x1xx |

TABLE 8-continued

| PV3 FEATURES | SUPPORT BIT POSITION OF $BS^5$ |
|---|---|
| US1 Vocoder | xxxx 1xxx |
| Interleaving | xxx1 xxxx |

Referring to TABLE 8, a bit stream (hereinafter "$BS_5$") having eight bits is defined for PV3. The least significant five bit positions of $BS_5$ are representative of five protocol features of PV3 with the most significant three bit positions being reserved. TABLE 8 illustrates a bit position indicating a support by a telecommunication station of a corresponding separate and distinct protocol feature of PV3. The $BS_5$ being xxx0 0000 indicates that none of the features of PV3 are being supported by a telecommunication station.

An exemplary bit map for PV4 is shown in the following TABLE 9:

TABLE 9

| PV4 FEATURES | SUPPORT BIT POSITION OF $BS_6$ |
|---|---|
| Enhanced Privacy and Encryption | xxxx xxx1 |
| Added Diversity For Improvement in Channel Errors GPRS-136 | xxxx xx1x |
|  | xxxx x1xx |
| +Code Dialing | xxxx 1xxx |
| Charge Indication Teleservice (CIT) | xxx1 xxxx |

Referring to TABLE 9, a bit stream (hereinafter "$BS_6$") having eight bits is defined for PV4. The least significant five bit positions of $BS_6$ are representative of five protocol features of PV4 with the most significant three bit positions being reserved. TABLE 9 illustrates a bit position indicating a support by a telecommunication station of a corresponding separate and distinct protocol feature of PV4. The $BS_6$ being xxx0 0000 indicates that none of the features of PV4 are being supported by a telecommunication station.

An exemplary bit map for PV5 is shown in the following TABLE 10:

TABLE 10

| PV5 FEATURES | SUPPORT BIT POSITION OF $BS_7$ |
|---|---|
| Removable User Identity Module (R-UIM | Xxxx xxxx xxx1 |
| EGPRS-136 | Xxxx xxxx xx1x |
| Adaptive Multi-Rate (AMR) | Xxxx xxxx x1xx |
| Fast Power Control | Xxxx xxxx 1xxx |
| Teleservice Over GSM SMS | Xxxx xxx1 xxxx |
| Transmit Diversity On DTC | Xxxx xx1x xxxx |
| High Penetration Paging (HPP) | Xxxx x1xx xxxx |
| System Assisted Mobile Positioning Through Satellite | Xxxx 1xxx xxxx |

Referring to TABLE 10, a bit stream (hereinafter "$BS_7$") having twelve bits is defined for PV5. The least significant eight bit positions of $BS_7$ are representative of eight protocol features of PV4 with the most significant four bit positions being reserved. TABLE 10 illustrates a bit position indicating a support by a telecommunication station of a corresponding separate and distinct protocol feature of PV5. The $BS_7$ being xxxx 0000 0000 indicates that none of the features of PV5 are being supported by a telecommunication station.

An exemplary bit map for frequency bands is shown in the following TABLE 11:

TABLE 11

| FREQUENCY BAND | SUPPORT BIT POSITION OF $BS_8$ |
| --- | --- |
| 800 MHz a&b Bands | xxxx xxx1 |
| 1900 MHz Bands | xxxx xx1x |
| 799 MHz c&d Bands | xxxx x1xx |
| 2 GHz IMT-2000 Band | xxxx 1xxx |

Referring to TABLE 11, a bit stream (hereinafter "$BS_8$") having eight bits is defined for the frequency bands. The least significant four bit positions of $BS_8$ are representative of four frequency bands with the most significant four bit positions being reserved. TABLE 11 illustrates a bit position indicating a support by a telecommunication station of a corresponding separate and distinct frequency band. The $BS_8$ being xxxx 0000 indicates that none of the frequency bands are being supported by a telecommunication station.

An exemplary bit map for additional telecommunication features is shown in the following TABLE 12:

TABLE 12

| ADDITIONAL FEATURES | SUPPORT BIT POSITION OF $BS_9$ |
| --- | --- |
| Analog | xxxx xxx1 |
| GHOST | xxxx xx1x |
| TTY | xxxx x1xx |
| WAP | xxxx 1xxx |

Referring to TABLE 12, a bit stream (hereinafter "$BS_9$") having eight bits is defined for additional telecommunication features. The least significant four bit positions of $BS_9$ are representative of four additional features with the most significant four bit positions being reserved. TABLE 12 illustrates a bit position indicating a support by a telecommunication station of a corresponding separate and distinct telecommunication feature. The $BS_9$ being xxxx 0000 indicates that none of the additional features are being supported by a telecommunication station.

Figure 2:
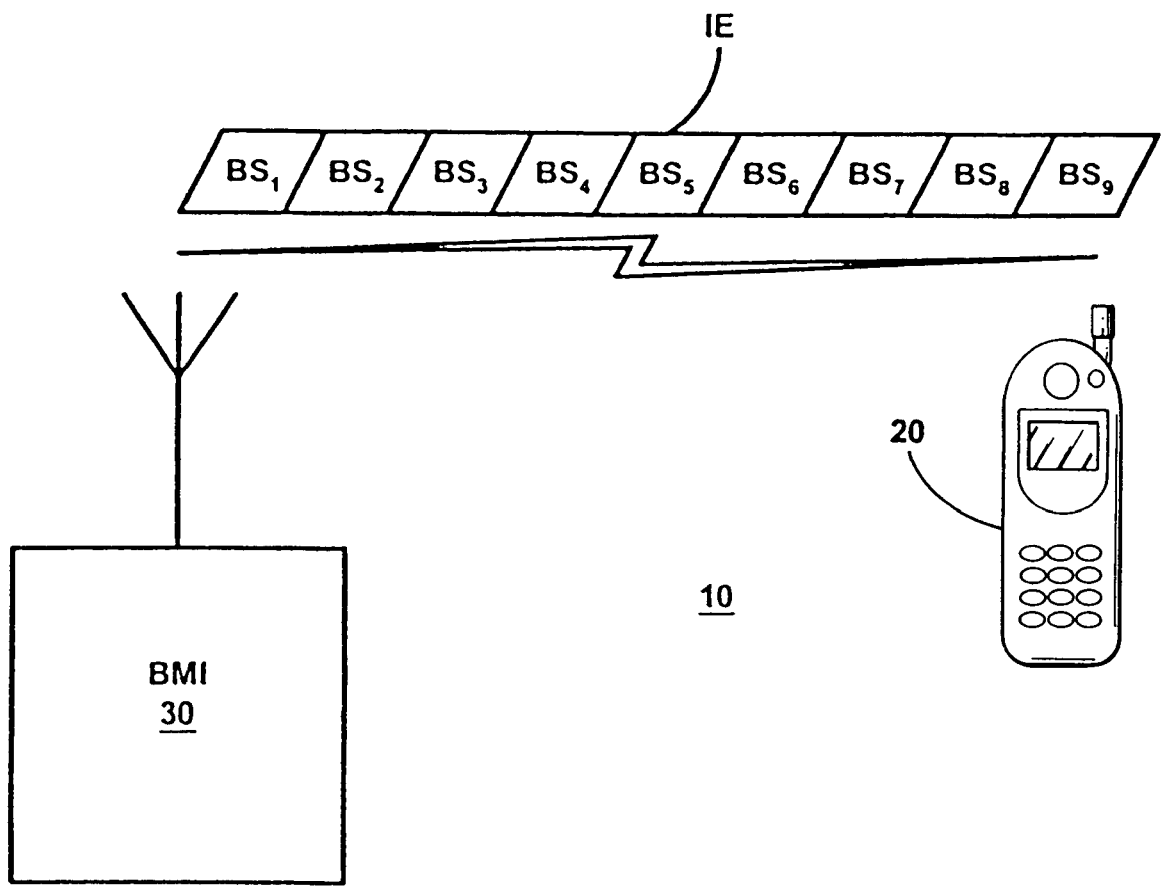
FIG. 2 is a diagram of a telecommunication network communicating an information element, in accordance with another embodiment of the present invention.

Referring to FIG. 2, a telecommunication network 10 comprising a mobile station 20 and a BMI 30 is shown. Alternative embodiments of network 10 can include two or more mobile stations 20 and/or two or more BMIs 30. Mobile station 20 stores an information element IE. One embodiment of information element IE is shown in the following TABLE 13:

TABLE 13

| ELEMENT | BIT STREAM | TOTAL BITS |
| --- | --- | --- |
| Protocol Discriminator | $BS_1$ | 2 |
| Message Type | $BS_2$ | 6 |
| PV1 | $BS_3$ | 32 |
| PV2 | $BS_4$ | 8 |
| PV3 | $BS_5$ | 8 |
| PV4 | $BS_6$ | 8 |
| PV5 | $BS_7$ | 12 |
| Frequency Bands | $BS_8$ | 8 |
| Additional Features | $BS_9$ | 12 |

Referring to TABLE 13, protocol discriminator and message type are conventional bit stream elements.

Mobile station 20 transmits information element IE in a data string format to BMI 30 as shown immediately after a Power-Up registration, a New System registration, a Forced registration, an ACC to DCCH registration, or a similar type of registration. BMI 30 receives information element IE and identifies each bit of bit streams $BS_1$-$BS_9$ being set to a logic "1" state. Consequently, BMI 30 is able to determine which features of PV1-PV5 as well as which frequency bands and additional telecommunication features are supported by mobile station 20. The BMI 30 can then configure its operations accordingly to communicate with the mobile station 20 using the supported features.

In other embodiments, BMI 30 can set a flag in a Audit Confirmation transmits information element to BMI 30 in response to the Audit Confirmation message. Also, in other embodiments, information element IE can be partitioned into single elements or subgroups of elements which can be separately transmitted to BMI 30. In yet other embodiments, BMI 30 can store information element IE therein and transmit information element IE to mobile station 20 as described herein.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for communicating support or absence of support of a plurality of protocol features, the method comprising:

receiving a plurality of bits, each individual bit indicating support or absence of support of a different protocol feature; and analyzing the received plurality of bits to determine which protocol features are supported by a first telecommunication station;

wherein each individual bit of the plurality of bits is set in either a first logic state or a second logic state, the first logic state indicating support of a protocol feature and the second logic state indicating absence of support of a protocol feature.

2. A telecommunication system comprising:

a second telecommunication station operative to receive a plurality of bits transmitted from a first telecommunication station, each individual bit indicating support or absence of support of a different protocol feature, and to analyze the received plurality of bits to determine which protocol features are supported by the first telecommunication station; and wherein each bit of the plurality of bits is set in either a first logic state or a second logic state, the first logic state indicating support of a protocol feature and the second logic state indicating absence of support of a protocol feature.

3. A computer-readable storage medium comprising a set of instructions, the set of instructions to direct a computer system to perform acts of:

receiving a plurality of bits, each individual bit indicating support or absence of support of a different protocol feature; and analyzing the received plurality of bits to determine which protocol features are supported by a first telecommunication station;

wherein each bit of the plurality of bits is set in either a first logic state or a second logic state, the first logic state indicating support of a protocol feature and the second logic state indicating absence of support of a protocol feature.

4. A method for communication support or absence of support of a plurality of protocol features, the method comprising:

defining a plurality of bits, each individual bit indicating support or absence of support of a different protocol feature; and sending the plurality of bits to a telecommunication station;

wherein each bit of the plurality of bits is set in either a first logic state or a second logic state, the first logic state indicating support of a protocol feature and the second logic state indicating absence of support of a protocol feature.

5. A telecommunication system comprising:

a first telecommunication station operative to define a plurality of bits, each individual bit indicating support or absence of support of a different protocol feature and to transmit the plurality of bits to a second telecommunication station wherein each bit of the plurality of bits is set to either a first logic state or a second logic state, the first logic state indicating support of a protocol feature and the second logic state indicating absence of support of a protocol feature.

6. A computer-readable storage medium comprising a set of instructions, the set of instructions to direct a computer system to perform acts of:

defining a plurality of bits, each individual bit indicating support or absence of support of a different protocol feature; and sending the plurality of bits to a telecommunication station;

wherein each bit of the plurality of bits is set to either a first logic state or a second logic state, the first logic state indicating support of a protocol feature and the second logic state indicating absence of support of a protocol feature.

* * * * *